United States Patent
Humphrey

[11] 3,751,138
[45] Aug. 7, 1973

[54] VARIABLE ANAMORPHIC LENS AND METHOD FOR CONSTRUCTING LENS

[75] Inventor: William E. Humphrey, Oakland, Calif.

[73] Assignee: Humphrey Research Associates, Oakland, Calif.

[22] Filed: Mar. 16, 1972

[21] Appl. No.: 235,134

[52] U.S. Cl.................. 350/181, 350/189, 351/169
[51] Int. Cl...... G02b 3/04, G02b 3/10, G02b 13/08
[58] Field of Search........................... 350/189, 181; 351/169

[56] References Cited
UNITED STATES PATENTS

| | | | |
|---|---|---|---|
| 3,305,294 | 2/1967 | Alvarez............................ | 350/184 X |
| 3,507,565 | 4/1970 | Alvarez et al.................... | 350/189 X |
| 3,583,790 | 6/1971 | Baker............................... | 350/189 X |
| 3,617,116 | 11/1971 | Jones............................... | 350/189 X |

*Primary Examiner* — John K. Corbin
*Attorney* — Townsend & Townsend

[57] ABSTRACT

An anamorphic lens is disclosed which generates variable cylindrical lens power and variable cylindrical lens rotational alignment over incremental viewpoints chosen through its surface. Cylinder power and rotation is a function of the displacement distance and angle of a selected viewpoint segment from a neutral viewpoint segment through the lens. The disclosed lens element finds a preferred use in confronting relation to an identical lens element having complementary curvature. When identical lens elements are confronted, so as to provide an optical path of view through overlapping portions of the confronted lens elements, translational displacement of the confronted elements provides the same cylindrical lens power and cylindrical lens rotation over the entirety of the overlapped lens elements. Simplified methods of manufacturing the complex lens surface are disclosed.

6 Claims, 12 Drawing Figures

FIG_1a

FIG_1b

FIG_2

FIG_3

FIG_4

FIG_5

FIG_6

PATENTED AUG 7 1973  3,751,138

FIG_7

FIG_8

FIG_9

FIG_10

FIG_11

VARIABLE ANAMORPHIC LENS AND METHOD FOR CONSTRUCTING LENS

This invention relates to lenses and more particularly relates to a variable power lens which provides variable cylindrical lens power and cylindrical lens rotation.

For cylindrical lens systems two descriptive specifications are required for their use. First, the desired cylinder power must be chosen. Secondly, the cylindrical lens must be rotated to its desired orientation. When this has been done, the desired difference in magnification of an image in each of two perpendicular directions is achieved.

When anamorphic lens systems are used, they are commonly used in combination with spherical optics. A common example of this is the phoropter or refractor used by ophthalmologists. When cylindrical lenses are conventionally used in combination with spherical optics, change of the effective focal length of the combined optics results.

This change of focal length of combined optics can best be understood by remembering that spherical objects can be emulated by crossing at 90° cylinder lenses of equal power. When a cylinder is used as an anamorphic insert in a spherical lens system, the effective total cylindrical component of the combined optics is changed. Change of the average spherical optic focal length results. For example, inserting a positive cylinder lens into a configuration of spherical optics having positive power will produce increased lens power on the average for the combination.

In addition to changing the effective spherical power of optics used in combination with anamorphic optics, the desired rotation of a cylinder is often hard to determine, especially where the diopter power of the cylinder correction is small. An example of this is the difficulty opticians commonly experience in determining the rotational alignment of an astigmatic correction to a patient's eye when the astigmatic correction is of extreme low diopter power. In essence the rotational alignment precision becomes dependent on the strength of the cylinder.

It is known to generate astigmatism by use of a variable power lens. Such a lens is disclosed in U.S. Pat. No. 3,305,294, issued Feb. 21, 1967, entitled "TWO ELEMENT VARIABLE POWER SPHERICAL LENS," to Luis W. Alvarez and U.S. Pat. No. 3,507,565, issued Apr. 21, 1970, entitled "VARIABLE POWER LENS AND SYSTEM" to Luis W. Alvarez and William E. Humphrey.

It will be understood that the cylinder optics there obtainable have many similar disadvantages to conventional cylindrical optics. It is necessary that the lens element or elements be rotated to achieve desired cylinder angular alignment. Difficulty in determining cylinder rotation alignment at low diopter cylinder power remains.

An anamorphic lens is disclosed which generates variable cylinder lens power and variable cylinder lens rotation over incremental viewpoints chosen through its surface. Cylinder power and rotation is a function of the displacement distance and angle of a viewpoint segment on the lens from a neutral viewpoint segment on the lens.

The lens element can be defined in terms of a thickness equation. A transparent lens media is chosen having two substantially parallel optic interfaces on either side with the transparent optical media of the lens therebetween. There is chosen an arbitrary "optic" axis which extends through the optic interfaces and through the transparent optical media substantially normal to the plane of the optic interfaces. Employing an orthogonal system of $x$, $y$, and $z$ axes, the optic axis of the lens is taken to be the $z$ axis and the effective optical thickness variation $t$ is measured parallel to this axis. The optical thickness of the lens element varies over its surface. This thickness variation includes an effective optical thickness variation ($t$) defined by the lens equation in $x$ and $y$ Cartesian coordinates within which the characterizing terms are:

$$t = A\,[(x^3/3) - xy^2]$$

WHERE:
- $x$ is distance along the $x$ axis;
- $y$ is distance along the $y$ axis;
- $A$ is a constant representative of the rate of lens power variation over the lens surface; and,
- $t$ represents optical thickness as the effective lens thickness parallel to the optic axis, taking into account both the geometrical thickness of the lens element taken in the mean direction of light rays passing through the lens and the refractive index of the material of the lens element when formed.

Regarding optical thickness, if the lens material is of uniform refractive index, $t$ (optical thickness) may be taken as the product of geometrical thickness times refractive index. Hence if there are variations in the refractive index, there will be compensating variations in the geometrical thickness.

It should be understood that the lens thickness here defined is a thickness variation which varies from place to place throughout the lens. This variation is dependent upon the $x$, $y$ displacement of a point on the lens from an origin of reference.

It should be understood that the lens here disclosed can be generated with respect to virtually any known surface. This surface does not have to form one face of a lens. Moreover, the surface can be an imaginary surface either interior of the material of the lens, exterior of the material of the lens, or partially interior and partially exterior of the material of the lens. Of course, it is required that a thickness variation be present in the optical element which follows the proper dimension relationship of the equation set forth.

In addition to the terms set forth, the thickness equation of the lens may have other optical terms, provided that such optical terms shall not contain any power of $x$ or of $y$ higher than the second power or any power of $xy$ other than the first power which has a coefficient of considerable magnitude relative to the constant $A$. Thus, the complete lens equation may be written:

$$t = A\,[(x^3/3) - xy^2] + Bx^2 + Cxy + Dy^2 + Ex + Fy + G$$

in which:
- $B$, $C$, $D$, $E$, $F$, and $G$ are constants that may be given any practical value, including zero.

In the circumstances wherein the two lens elements are employed together, the values of $B$, $C$, $D$, $E$, $F$, and $G$ may not be the same in the thickness equation for the two elements. The magnitude of $A$ should be the same in both equations with opposite algebraic signs.

It is also possible to express the equation of this invention in polar coordinates. Such an expression has the value:

$$t = A [(r^3/3) \cos 3\theta]$$

WHERE:
 $t$ is optical thickness as described hereinabove;
 $A$ is a constant representative of the rate of lens power variation over the lens surface as described hereinabove;
 $r$ and $\theta$ are polar coordinates of a particular element of area.

An object of this invention is to set forth a single lens element constructed in accordance with the above equational limitations which element provides at preselected incremental viewpoints along its surface predictable cylindrical lens effects of desired power and desired axial rotation.

An advantage of this predictability of the cylindrical power and cylindrical rotational axis is that the displacement of a view segment through the lens relative to a neutral segment of view through the lens can be radially equated to power and angularly equated to cylinder rotation.

Another advantage of the single lens element is that it generates a cylinder correction of positive cylinder at a preselected angular alignment and a negative cylinder of equal power normal to the positive cylinder. Hence, the average focal length of spherical optic used in combination with the lens element remains unchanged.

A further advantage of this invention is that the displacement position of a selected viewing segment measured counter-clockwise from a line scribed along the lens element through segmnts of the lens where cylinder rotation is of a 0° equates to one-half the desired cylinder rotation. Thus, the angle of cylinder rotation can be determined on an angular scale expanded by a factor of two; determination of cylinder rotation with greater precision is possible.

Yet another advantage of this invention is that rotation of the lens element is not required. Mere translation of a viewing segment along the surface of the lens is sufficient to produce desired cylindrical power and cylinder rotation.

Yet another advantage of the lens element of this invention is that the entire plane of the lens element presents a spectrum of unambiguous incremental solutions to cylinder power and cylinder rotation. No two viewing segments through the single lens element are the same.

Yet another advantage of the lens element of this invention is that it may be used confronted to an identical lens element.

An advantage of the confronted lens elements is that the entire area of overlap of the two lens elements is furnished with uniform cylinder power and cylinder rotation. Restriction of view to a discrete viewing segment, required in the case of a single lens element, is not required in the case of confronted lens elements.

As in the case of the single lens element, the lens elements in tandem can generate cylinder power and rotation without effecting the average focal length of spherical lenses used in combination. In other words, the fact that the cylinder power and cylinder rotation of crossed equal but opposite power cylinders is inserted and changed in an optical train does not require complementary modification to spherical optics in the optic train to maintain best average focus.

Yet another advantage of using paired elements of this invention is that cylindrical lens power and cylindrical lens rotational alignment can be measured relative to the displacement between the two confronted lens elements.

An advantage of this is that the displacement of the elements can be plotted on polar coordinates and thereafter used to read lens power and lens rotational orientation.

Yet another advantage of this invention is that a combination of three counter-moving elements can be used in tandem. This tandem alignment give a greater angle of view with the desired anamorphic correction.

Still another advantage of this invention is to disclose improved methods of manufacture of the complex lens surface which does not require separate grinding of discrete areas of the compound surface with resultant increased chances for error resulting in optical imperfections of the lens.

According to one method for fabricating the lens, the lens or matrix for a lens can be formed of a solid piece of plastic or softened glass gripped between opposed and confronted cylinders, each cylinder being shaped on its edge to the peripheral dimensions of the lens elements. The plastic upon being heated and conformed to the shaped cylinders produces a lens surface. Lens elements can either be directly fabricated from this material or alternately a matrix or die formed from which elements can be produced.

An advantage of this method of lens construction is that polishing of the compound optical surface is not required.

Yet another method disclosed for the manufacture of this lens is to stretch an elastic membrane across a boundary defining the lens periphery at a given radius. Using this stretched membrane as a matrix, lens elements can be formed having the compound curvature of the lens element of this invention.

Other objects, features and advantages of this invention will be more apparent after referring to the following specification and attached drawings in which.

Figure 1A:
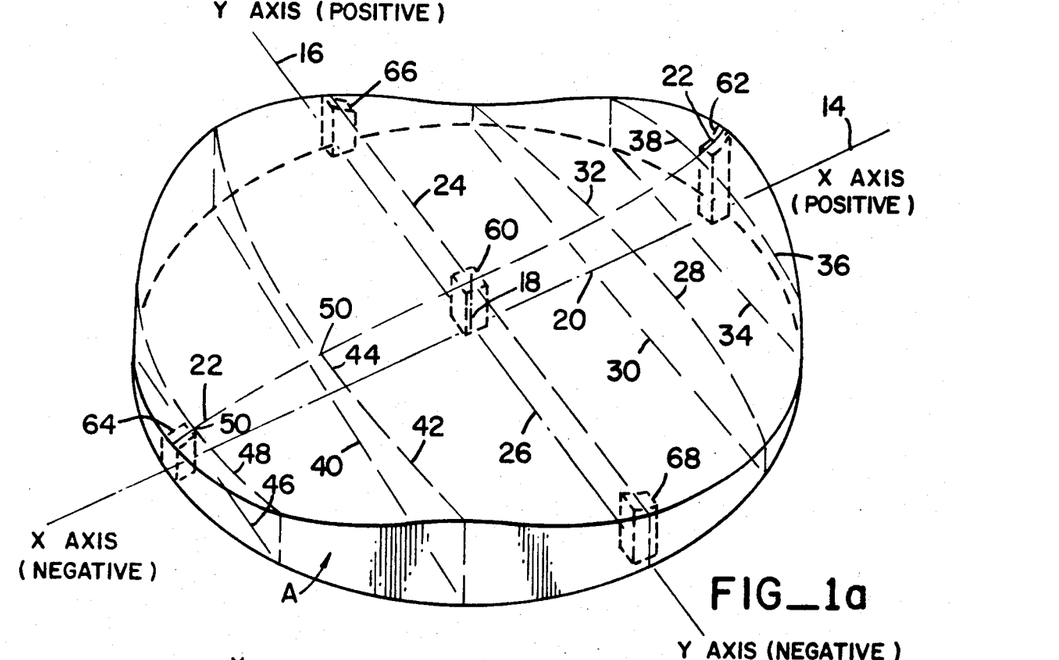
FIG. 1a is an enlarged perspective view of the lens element of this invention with broken lines shown defining sections through the lens to illustrate the shape of the lens element.

FIG. 1 illustrates a single lens element A having a thickness that varies in accordance with the characterizing terms of the lens equations. The thickness is exaggerated in all the drawings herein for clarity. Preferably, the lens element is quite thin in relation to its width, and the top and bottom faces appear to the naked eye to be almost the same in shape. As will hereinafter be more fully set forth, mathematical approximations valid for thin lenses can be used in deriving the base lens equation fo the lens element of this invention.

The material from which the lens element is manufactured may be made of optical glass, transparent plastic, or any other material suitable for the manufacture of lenses. Both top and bottom surfaces of the lens element are polished so as to form a conventional optical interface at these surfaces.

The lens equation hereinbefore set forth is defined in terms of lens thickness (t) as plotted on a three dimensional mutually orthogonal $x$, $y$, and $z$ coordinate system. As shown in the perspective view of FIG. 1a, the $x$ axis 14 is positive to the upper right and negative to the lower left. Similarly, $y$ axis 16, disposed at conventional right angles to the $x$ axis, is positive to the upper left and negative to the lower right of FIG. 1a.

$z$ axis 18 is orthogonal to the $x$ axis and $y$ axis. It is in this direction that the optical thickness (t) of the lens is measured.

The optical thickness (t) is defined in terms of thickness equation:

$$t = A [(x^3/3) - xy^2] + G$$

WHERE:
$x$ is the distance along the $x$ axis;
$y$ is the distance along the $y$ axis;
$A$ is a constant that determines power of variation in the lens; and,
$G$ is a constant representing thickness of the element at the zero position on the $x$ and $y$ axis.

Some observations may now be made specifically about other parameters controlling the manufacture of the lens.

As illustrated, the lens element has a flat bottom optical interface, and has a top optical interface formed as a compound and complex curved surface defined by the lens equation. However, it is not essential that either of these lens surfaces be of any particular shape. It is only necessary that the thickness variations are substantially in accordance with the equation herein described. For example, the bottom surface could have virtually any type of shape and the shape of the top surface altered with respect to the bottom surface to maintain the desired thickness variation over the coordinate base. The bottom surface can be made spherical and the shape of the top surface altered accordingly to maintain the thickness variation throughout the lens within the limits of the equation set forth. Alternately, the thickness variation can be distributed equally above and below a flat or curved plane.

As a general limitation upon lens shape, the surfaces should not be so steep that total reflection occurs. Restriction of the thickness variation to no more than one-half the lens width is a reasonable limitation. The angles of the lens surface with respect to a plane normal to the $z$ axis (the effective optical axis) is limited to less than 30° to 40°.

Both surfaces at the top and bottom of the lens element are polished. That is to say they are optical interfaces through which light may pass and be deflected. While Fresneling techniques can be used in the manufacture of this lens, it should be understood that the effective optical thickness (t) should follow the limitations set forth here in any particular Fresnelled area.

In deriving the lens equation set forth herein, the usual mathematic approximations that are valid for thin lenses such as spectacle lenses have been made. Specifically, it has been assumed that transverse displacement of light rays in the plane through the $x$ axis and $y$ axis is negligible. Moreover, the sine of all angles of deflection are numerically equated to the angles themselves measured in radians. Additionally, it is assumed that the deflection angle is independent of the tilt of a lens element with respect to the incoming or outgoing light rays.

It should be understood, that this invention is not limited to thin lenses. It may also be used in relatively thick lens systems such as fast camera lenses and in other cases where thin lens assumptions are not valid. In such cases, the basic lens equations hereinbefore set forth may be used to obtain the first tentative design. Then, the aberrations of the lens may be investigated, using graphical ray tracing, machine computation, and other techniques known to those skilled in the art, to revise the lens design for minimizing aberrations. In general, the thickness variation in the final design will differ only to a sight extent from the prescription specified by the basic lens equations. The thickness of the variable astigmatic lens element will substantially conform to the basic equations herein disclosed.

The correction of aberration may introduce into the lens equation additional terms of powers of $x$ higher than $x^2$ or powers of $y$ higher than $y^2$ or products of $x$ and $y$ in which either the $x$ or $y$ has a power greater than one. The coefficients of such other terms will be small compared to the constant $A$. Hence the other terms will not effect the substantial conformity of the lens to basic lens equations set forth herein.

Now that we have set forth the mathematical description of the lens element, some attention can be given to the exaggerated geometric portrayal of the lens element as shown in FIG. 1a.

Taking a section through the lens element normal to the y axis at y equals zero, this section terminates at the lower surface of the lens along the border 20 and terminates at the upper surface of the lens along the border 22. Border 22 varies with respect to border 20 by the function:

$$h = t/n = [A (x^3/3) + G] (1/n)$$

WHERE:
  $n$ is the index of refraction,
  $x$ is the distance along the x axis,
  $A$ is a constant that determines the power variation in the lens, and
  $G$ is a constant representing the thickness of the element at the intersection of the $x$ and $y$ axes.
  $h$ is the height along the $z$ axis between borders 20, 22.

Border 22 varies with respect to the x axis as a function of the cube of x. It can be readily seen for the particular lens surface illustrated here that for the most negative value of $x$, $G$ must be greater than $x^3$ for the particular lens element generated.

A section normal to the x axis at x equals zero is a point of constant thickness along the lens element. This thickness is defined by the term $G$. It can be readily understood that where $x$ is zero, as it is on all positions overlying the y axis, the variable terms $xy^2$ or $x^3/3$ will have a zero value. Hence, the thickness of the section between lines 26 passing directly along the y axis and lines 24 intersecting the upper surface of lens element A overlying the y axis remains constant.

Further understanding of the lens surface can best be understood by taking sections through lens element normal to the x axis. Referring to that section taken between border 28 described on the top surface of the lens element and border 30 described on the bottom surface of lens element, it will be immediately seen that border 30 is a straight line. Border 28, however, is a parabola. This parabola has a vertex 32 at its point of intersection with border 22 overlying the x axis.

Similarly, a section at 34 normal to the x axis at an increasing positive value of x describes a parabola 36 of increasing curvature. This parabola has its vertex 38 at a point further removed from the lower surface of the lens element.

Assuming that an infinite number of sections through the lens element are taken normal to the x axis, it will be found that the upper border of each of the sections will be parabolic. These parabolic sections will have increasing curvature as the distance along the x axis increases in the positive direction.

Referring to similar sections each taken through the lens element normal to the x axis at points where values of x are negative, a series of parabolas will be again described. Referring to a section taken at a negative x value through a border 40 on the bottom surface of lens element A, a parabolic surface will be described along an overlying border 42 at the top surface of element A. The parabola of border 42 will have its vertex at 44 where it crosses previously described border 22 overlying the x axis.

The border 42, being at all points located in a negative x area, will have a curvature opposite to the borders 28 and 36 in the positive x area. Thus, the portion of the lens element in the x negative area will be concave in these sections; the portion of the lens element in the x positive area will be convex in these sections.

Assuming that a second section is taken normal to the x axis at an increasingly negative position of x, as shown at border 46, a parabola 48 of increasing curvature will be defined where the section intersects the upper surface of lens element A. This parabola, similar to all other parabolas here described, will have a vertex 50 at the point of intersection between previously described border 22 and border 48. As in the case of positive x values, for negative values the parabolic borders of an infinite number of sections taken through the lens element normal to the x axis will have increasing curvature for increasing values of negative x.

It should be understood by all those reading this disclosure that the series of broken lines on the lens element of FIG. 1a are all imaginary. In actual construction the lens would not include such borders scribed on it. They are placed here only for purposes of making the complex curvature of this lens element known to those who would wish to practice this invention.

It should also be understood that the thickness variation described herein can be provided with additional terms. These additional terms can be properly described by the equation:

$$t = A [(x^3/3) - xy^2] + Bx^2 + Cxy + Dy^2 + Ex + Fy + G$$

where $A$, $B$, $C$, $D$, $E$, $F$, and $G$ are constants that may be given any practical value, including zero.

These additions to the thickness variations (t) can be analyzed.

The function $Bx^2$ is the equation for a cylinder generated aligned along the y axis, and the function $Dy^2$ is the equation for a cylinder generated aligned along the x axis. The function $Cxy$ is the equation for diagonal crossed cylinders of opposite power at 90° relative orientation, one to another. The function $Ex$ is the equation for a prism, constant for all values of y and varying for all values of x. The function $Fy$ is the equation for a prism, constant with respect to all values of x and changing for changing value of y. The constant $G$ as has been previously described relates to thickness of the lens.

It should be understood that the equations set forth with respect to the constants $B$, $C$, $D$, $E$, $F$, and $G$ are additional thickness variations which can be added to the main thickness variation described with respect to the constant $A$. Typically, the constants $B$, $C$, $D$, $E$, $F$, and $G$ have a much smaller effect on the element thickness than the constant $A$ and are indeed for the approximations used in thin lenses, completely ignored.

Having set forth the parameters of the anamorphic lens element in Cartesian coordinates it should be realized that this lens element can just as well be described in polar coordinates. Specifically, the optical thickness $t$ can be described by the equation:

$$t = A (r^3/3) \cos 3\theta + G$$

where $r$ and $\theta$ are polar coordinates and A is the constant that determines power variation in the lens on the axis thereof. It can be readily seen that if $\theta$ is 0 where $r$ lies along the x axis, border 22 of the upper surface of lens element A overlying the x axis will be described as a function of:

$r^3/3$ This is precisely analogous to the previously illustrated curve:

$$x^3/3$$

for Cartesian coordinates when $y = 0$. Also the polar coordinate equivalents of the function governed by constants B, C, D, E, F, and G may be added to the surface description.

As will be apparent to those having skill in mathematics, a section taken through the lens element at 120° and 240° counterclockwise from the x axis will include a thickness variation of $r^3/3$.

When rotation occurs of the polar coordinate r, the function of t will vary as a function of the term:

$$\text{Cos } 3\theta$$

This will fluctuate between positive unity and negative unity. For example when r is rotated to an angle of 30°, and Cos $3\theta$ is equal to zero, a cross section through the lens element A will describe a constant width G, precisely analogous to that section normal to the x axis at $x = 0$ bounded by lines 24, 26. As will be apparent to those skilled in the art, sections through lens element A of constant section G will occur three times at intervals of 30°, 90°, and 150° counterclockwise from the x axis.

Having described the construction of the single lens element A in some detail, the optical effect of the lens element can be set forth.

It must be remembered that two possible uses of this lens element have been set forth. The first use is where a view path is described through a discrete segment of a large lens element. This is shown with reference to FIG. 1a and FIG. 1b. A second use of the lens element is where two overlapping and identical lens elements are confronted one to another. Depending upon the translation of these elements one with respect to another, the resultant overlapped surface of the lens element produces the desired anamorphic effect. This second use of the lens elements is illustrated in FIGS. 2–6.

Figure 1B:
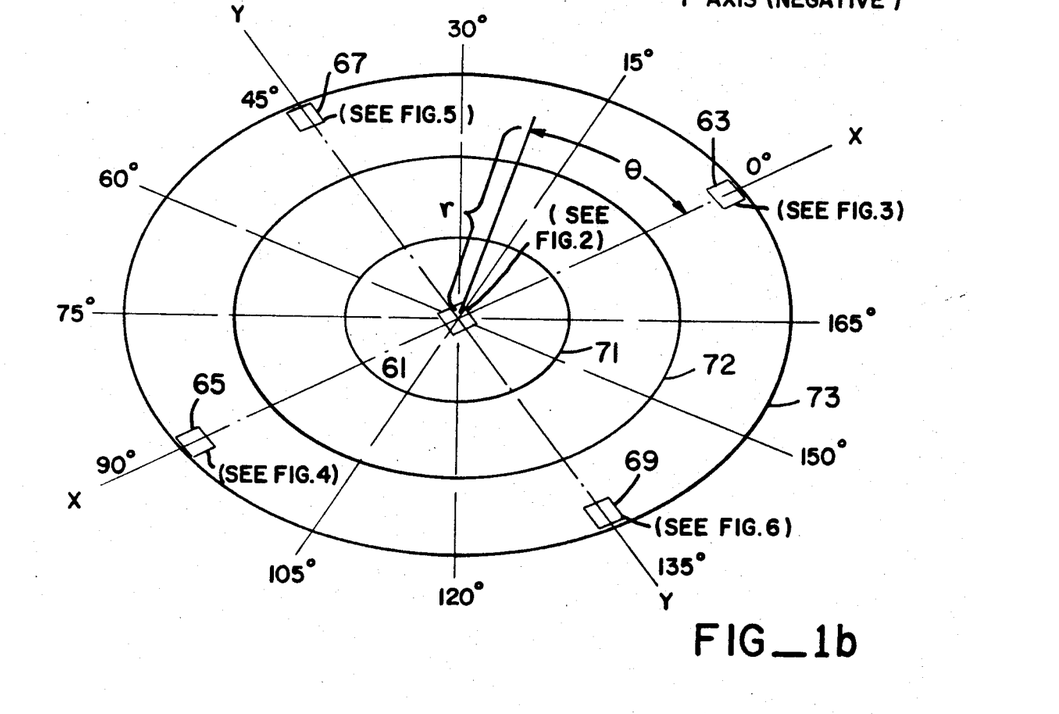
FIG. 1b is an underlying polar coordinate plot in perspective relative to FIG. 1a for illustrating the obtaining described cylinder power and cylinder rotation utilizing a single lens element.

Referring to FIGS. 1a and 1b, and assuming that the lens element A is rather large in diameter, say in the order of 4–6 inches, and the constant A is small enough so that the variation of refractive effect is small over an area corresponding to the eye pupil, views through discrete segments of the lens element will produce variable anamorphic optical effects. These optical effects will be illustrated by first plotting their location through the lens element shown in FIG. 1a and thereafter referring to FIGS. 2–6 to illustrate with respect to the written word "VIEW," the specific resultant anamorphic effect.

Figure 2:
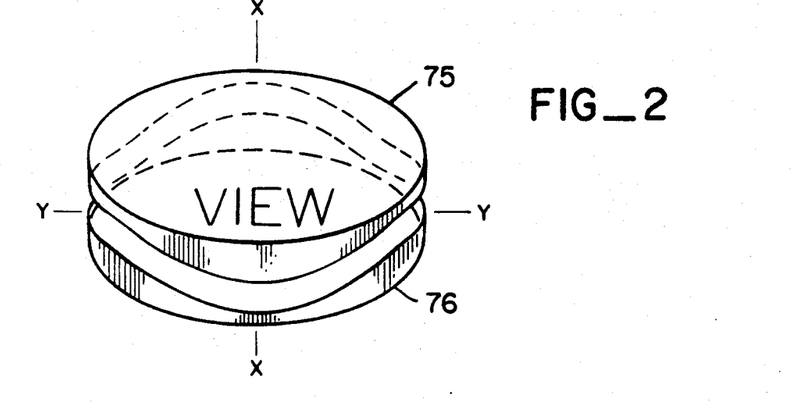
FIG. 2 illustrates two lens elements of FIG. 1 on a reduced scale shown in perspective, the lens elements confronted one to another at their surfaces of compound curvatures, the overlapped lenses here being overlapped in a neutral position to have no anamorphic effect when looking through the lens elements onto the written word "VIEW"

Assuming that a view path 60 is selected through lens element A at the intersection of the x and y axes and the optical path of view is chosen parallel to the z axes, no anamorphic effect will be generated. This is the neutral point of the lens and is illustrated on the polar coordinate plot of FIG. 1b at area 61. If one were to look through the lens element along this axis upon a printed word such as the word "VIEW," there would be no distortion to the word "VIEW." The word would appear substantially as it is illustrated in FIG. 2.

Figure 3:
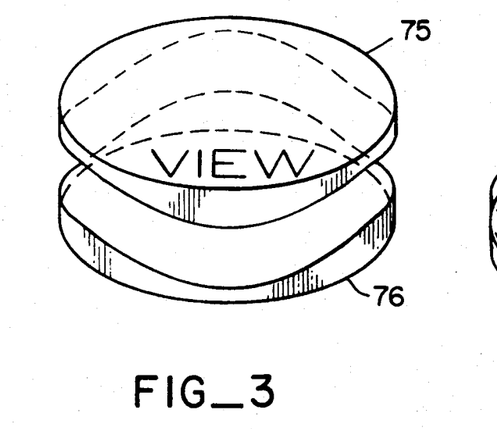
FIG. 3 illustrates the lenses of FIG. 2 with the upper lens being displaced rearwardly and the view through the overlapped lens elements showing the word "VIEW" anamorphically expanded horizontally and compressed vertically.

Assuming that the view path has moved along the x axis to a positive position of x, a new view path 62 is taken through the lens element at a discrete segment. A positive cylinder correction aligned along the x axis will be generated. A negative cylinder correction aligned parallel to the y axis will additionally be generated. The two cylinder corrections will each be of equal and opposite power. Upon establishing an optical path like this through the lens element onto the word "VIEW" the word will be horizontally magnified and vertically compressed (assuming the word "VIEW" is written parallel to the y axis). The word "VIEW" will appear as it is illustrated in FIG. 3. (It being understood that the lens element is being demonstrated closer to the word "VIEW" than to the eye. If the element is close to the eye, a relatively constant astigmatic correction takes place).

Assuming that a new view path 64 is chosen through the lens element at a point overlying the x axis at a negative value of x, an opposite anamorphic effect will be generated. At this location, a negative cylinder along the x axis will be generated while a positive cylinder of equal power parallel to the y axis will be generated. Upon viewing the word "VIEW" anamorphic magnification of the word "VIEW" in the vertical direction with compression of the word "VIEW" in the horizontal direction will occur. This is illustrated with respect to FIG. 4.

Referring to view path 62 and 64 it will be remembered that the standard ophthalmological convention for describing the rotation of anamorphic lens systems having cross cylinders of equal and opposite powers is to describe the rotational orientation of the positive cylinder counterclockwise with respect to a horizontal or 0° axis, as viewed from in front of the lens. Thus in the case of the view path 62, where the positive cylinder was in alignment with the x or horizontal axes the cylinder rotation had a value of 0°. Conversely, in the case of view path 64 where the positive cylinder is aligned vertically and parallel to the y axis the rotation of the anamorphic lens system is properly described as 90°.

Assuming that a view path 66 is taken at a position along the y axes through a discrete segment of the illustrated lens element, an intersecting angular phenomenon of the lens element occurs. At segment 66 a negative lens cylinder will be generated at a 45 angular degree interval to the x axis, this angular interval being defined counterclockwise from the x positive axis. Similarly, a positive cylinder of equal and opposite power will be generated. This positive cylinder will have an alignment 135° of its axes counterclockwise from the x positive axes. In ophthalmological convention (which results in counterclockwise rotation in the case of FIG. 1b), the cylinder rotation will be described as 45°. Looking through the view path 66 onto a word "VIEW" will result in optical magnification of the word "VIEW" along a first diagonal, optical compression of the word "VIEW" along another diagonal normal to it. This is illustrated with respect to FIG. 5.

Assuming that a new view path 68 is chosen through the y axis at a negative value of y, an opposite anamorphic effect as illustrated with respect to view path 66 will be generated. A positive cylinder will be generated at 45° counterclockwise rotation from the x positive axis. An effective negative cylinder will be generated at 135° counterclockwise rotation from the x axes. The result, similar to that illustrated with respect to view path 66 will be compression of the word "VIEW" along one diagonal and magnification of the word "VIEW"

along another diagonal. Unlike the case of the view path 66 the compression of the word "VIEW" will occur along the diagonal previously magnified and the magnification of the word "VIEW" will occur along the diagonal previously compressed. Such anamorphic magnification of the word "VIEW" can be seen in FIG. 6.

Using conventional cross cylinder optics of equal and opposite power, it will be remembered that after such cross cylinder optics have been rotated together over 180° of rotation, all possible cylinder rotations have been obtained. Continuing to rotate the conventional cylindrical optics beyond 180° will only result in a repetition of anamorphic effects previously obtained in the first 180° of rotation.

The lens element here illustrated, however, does not produce this effect. Rather, it can be seen by viewing through the view paths 62, then 66, then 64, and finally 68, that an angular counterclockwise position of the viewing segment from the x axis corresponds to twice the produced cylinder rotation for the positive cylinder. Stated in other terms the angle of cylinder rotation is equal to one half the angle $\theta$ as defined counterclockwise from the axis. Thus, the cylinder rotation is effectively expanded by a factor of 2. Cylinder rotation at low optical powers can be more effectively determined.

It can thus be seen from the invention that equal translation of the elements produces equal variation in refractive effect in any domain of cylindrical power or orientation. It has been found that the translations are in fact more sensible basis for description of astigmatism than is the rotation of cylinder power and orientation.

All of the view paths 62, 64, 66 and 68 have been shown in FIG. 1a as being located a constant distance from the neutral view path 60. With the lens equation here set forth the power of the crossed positive and negative cylinders will be the same in all the instances of these view paths 62, 64, 66 and 68. Only the rotation will change. Changing the radius of the effective view paths will vary the power of the cross cylinders but will not vary their rotation.

It can immediately be seen that the cylinder power and rotation of a view point through the lens element from the neutral lens segment 60 can be plotted on polar coordinates. Such a plot is illustrated with respect to FIG. 1b.

Referring to FIG. 1b, the polar coordinate plot is illustrated. Conventional x, y axes are plotted. From a positive value of x position cylinder rotation of crossed cylinders of equal and opposite power is set forth. The positive cylinder rotation varies from the 0°-180° (or back to 0°). Points on the plot corresponding to the view point view paths through the lens element previously illustrated are selected. Area 61 corresponds to neutral view paths 60; area 63 corresponds to view path 62; area 65 corresponds to view path 64; area 67 corresponds to view path 66 and area 69 corresponds to view path 68.

A series of concentric polar circles about the intersection of the x, y axes are plotted at circles 71, 72, and 73. These circles will represent points of equal cylinder power. It is thus seen that the cylinder power and angular cylinder correction can be plotted on a polar basis, and easily removed from the polar graph in the form of a prescription.

Having set forth the use of a single lens element of this invention having discrete view paths chosen through preselected segments of its surface to generate variable anamorphic effects, attention can be now given to using the lens elements in confronting relation. For this purpose reference can be made to FIGS. 2-6.

With reference to FIG. 2, two lens elements 75 and 76 are illustrated in perspective. Lens element 76 is illustrated with an x axis being vertically disposed and the y axis being horizontally disposed. Referring back to FIG. 1a, it can be seen that the x negative axis is towards the bottom of FIG. 2 and the x positive axis is towards the top of FIG. 2. As is conventional, the y positive axis of lens 76 is to the right, the y negative axis to the left.

A second lens element 75 is confronted to lens element 76. For lens element 75 the x and y axes alignment, when compared to the alignment of FIG. 1a, is precisely reversed. The x positive axis is towards the bottom of FIG. 2, the x negative axis is towards the top of FIG. 2.

Assuming that both lens elements are of identical construction, it will be immediately seen that when their surfaces are confronted one to another and the elements 75, 76 are moved to an overlying relation, they will together define a solid transparent effective optical medium of constant thickness. Assuming that each lens was generated to a constant thickness $G$, the effective thickness of the neutral medium formed by the confronted lens elements will be $2G$.

Relative x and y displacement (always without any relative rotation) between the two confronted optical elements 75 and 76 produces anamorphic effect.

Referring to FIG. 3 such an anamorphic effect is illustrated. As viewed in FIG. 3 lens element 76 has been moved upwardly from the viewer. The lens elements no longer overlap one another in the entirety.

When a view is taken through the overlapped lens elements 75 and 76 in the position illustrated in FIG. 3, the anamorphic distortion across the overlapped portions of the lens elements is constant and is not restricted to a discrete viewing segment. Thus, upon looking through the lens elements of FIG. 3 at their overlapped portion and onto the word "VIEW," magnification along the horizontal axis and compression along the vertical axis will occur.

Figure 4:
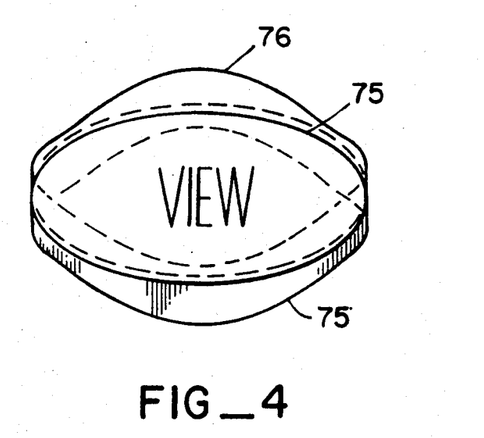
FIG. 4 illustrates the lens elements of FIG. 2 with the top lens element displaced forwardly relative to the lower element and the view through the overlapped lens elements showing the word "VIEW" anamorphically compressed horizontally and expanded vertically.

Referring to FIG. 4, lens element 75 has been moved downwardly from the viewer, lens element 76 moves upwardly from the viewer. Anamorphic effect generated is the opposite of that shown in FIG. 3. The word "VIEW" is horizontally compressed and vertically magnified.

Figure 5:
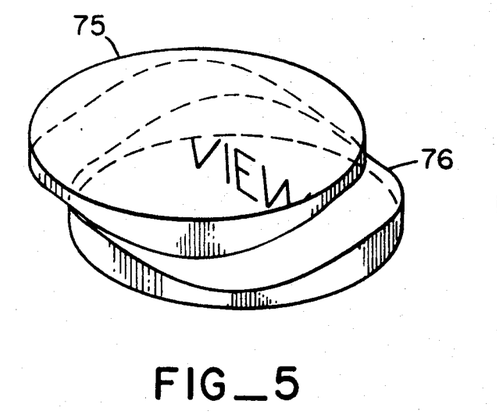
FIG. 5 illustrates the lens elements of FIG. 2 with the upward element displaced to the left of the lower element and the view through the overlapped lens elements showing the word "VIEW" anamorphically elongated along one diagonal and compressed on the opposite diagonal.

Referring to the FIG. 5, lens element 75 has been moved to the left of lens element 76. Magnification of the word "VIEW" along one diagonal with compression of the word "VIEW" along another diagonal has occurred.

Figure 6:
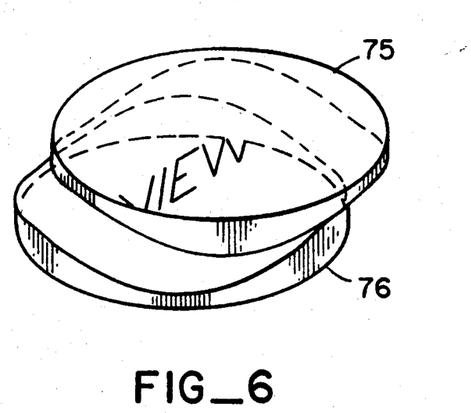
FIG. 6 illustrates the lens elements of FIG. 2 with the upper lens element displaced towards the right and the view through the overlapped lens elements showing the word "VIEW" anamorphically compressed along one diagonal and expanded along the opposite diagonal.

Conversely and with respect to FIG. 6, element 76 has been translated to the left of the element 75. Magnification of the word "VIEW" along a diagonal parallel to that previously compressed with respect to FIG. 5 has occurred. Similarly, compression of the word "VIEW" along a diagonal parallel to the diagonal previously expanded in FIG. 5 has occurred.

The effects illustrated in FIGS. 2-6 can be easily understood. It will be remembered that each lens element 75 or 76 has a neutral view segment taken through it.

When that neutral view segment is displaced so that it looks through a non-neutral segment of the confronted lens element, an anamorphic correction occurs. All other points in the overlapped and confronted lens surfaces will combine to produce that particular anamorphic correction. This is because all other points will have equal but opposite deviations in cylindrical power which will in effect cancel.

It also can be readily understood that the polar coordinate plot of FIG. 1b equally applies to the lens displacements of FIGS. 2–6 as it applies to a single lens element having discrete view points taken through it. These view points have been previously correlated with respect to the view paths 60, 62, 64, 66 and 68 taken through lens element of FIG. 1a.

Figure 7:
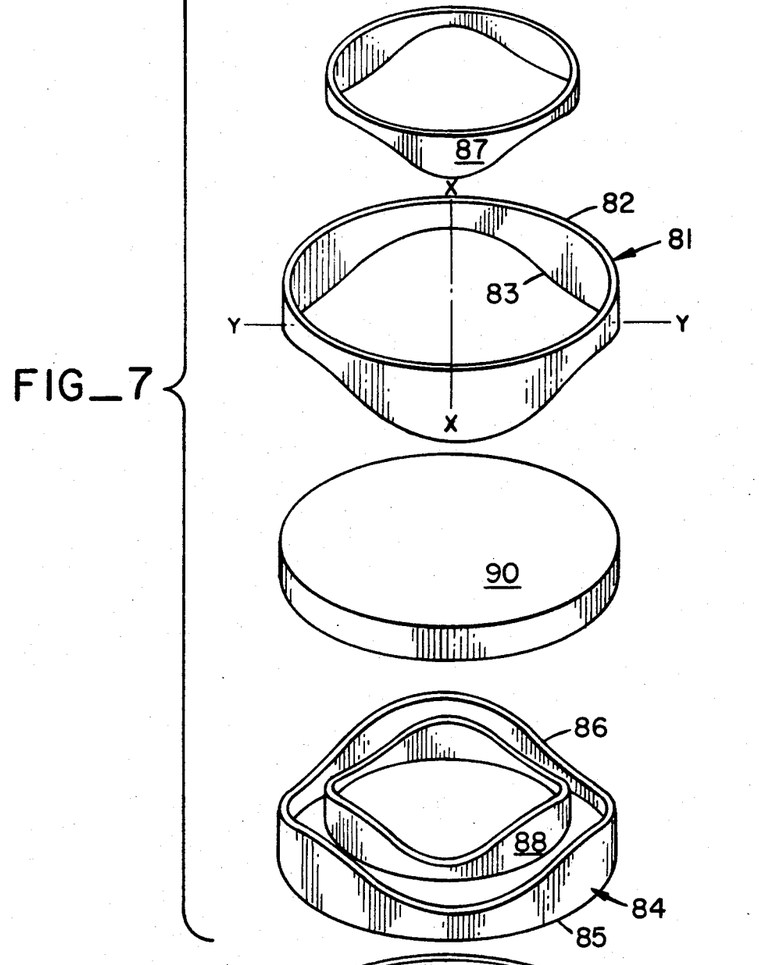
FIG. 7 is an exploded view of an apparatus for manufacturing the lens element including inner and outer ring molds with a solid disc of lens material therebetween.
Figure 8:
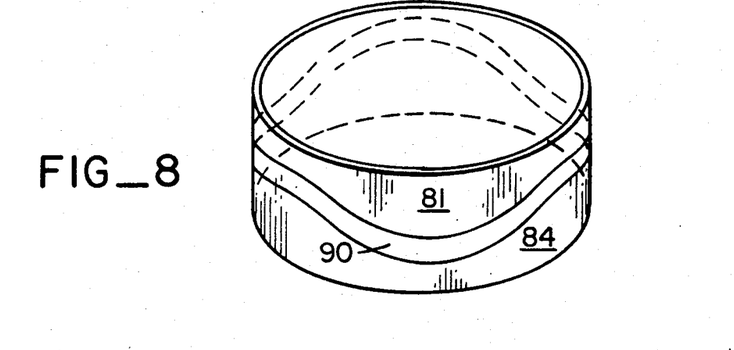
FIG. 8 is a perspective view similar to FIG. 7 showing the lens material after the lens molds have been forced one towards another under pressure to shape the lens element (it being noted that the inner ring mold has been omitted here for purposes of clarity)
Figure 9:
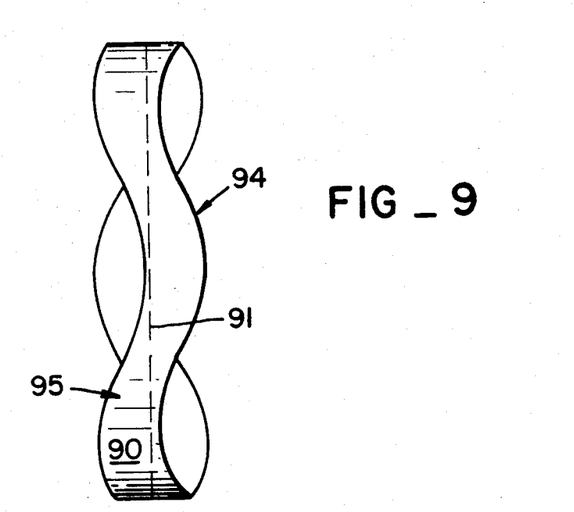
FIG. 9 is an illustration of the lens material conformed in FIG. 8 after it has been removed with a broken line illustrating a plane of cut and polished to fabricate two complementary lens elements.
Figure 10:
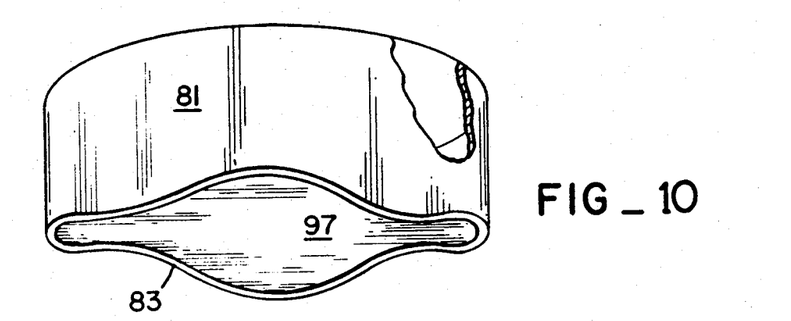
FIG. 10 is an illustration of a mold matrix which can be used to cast lens elements for yet another method of fabricating the lens element of this invention; and, FIG. 11 illustrates a modification of the invention in which three lens elements placed in tendem can be used for wide angle anamorphic applications.

Having set forth the operation of the lens element of this invention, some attention can now be directed to ways in which the lens element can be fabricated. FIGS. 7, 8 and 9 illustrate one method whereby lens fabrication can occur. FIG. 10 illustrated another method whereby lens fabrication can occur.

Referring to FIG. 7, the formation of a lens material between confronted ring molds is illustrated. These ring molds are shown in exploded relation with respect to the lens material.

An upper and outer ring mold 81 is formed from a cylinder having an upper end 82 defined along a plane normal to the axis of generation of the cylinder. The lower end 83 of cylinder 81 varies in depth with respect to end 82. This variation occurs according to the equation:

$$h = A (r^3/3) \cos 3\theta + G$$

WHERE:
$h$ is the distance between surface 82 and 83;
$r$ is the radius of the cylinder;
$\theta$ is the angle of rotation from the $x$ axis;
$A$ is a constant that determines the power variation in the lens over the lens surface; and,
$G$ is the desired structural thickness of the cylinder.

Ring mold 84 is fabricated in precisely the same way. It has one surface which is formed along a plane normal to the axis of the generated cylinder 85. The upper surface 86 is formed at a height of the cylinder 85 sidewalls which varies in accordance with the same equation.

It should be understood that the lens elements of this invention can be formed from confronting a number of ring molds of increasingly smaller dimension. Such smaller ring molds happen to be illustrated in FIG. 7 at 87, 88. For convenience they are not shown in FIG. 8.

In the fabrication of the lens element ring molds 81 and 84 are typically confronted towards one another. Thereafter, a solid disc of lens material is inserted between the molds. The molds are then compressed one towards another so that they will confront one another to form a cylinder of constant thickness. Assuming that the disc of lens material 90 is made of optical plastic and confrontation takes place in the presence of heat, a depth formation of the disc of lens material 90 between the confronted elements 81 and 84 will occur. This can be seen in FIG. 8.

When disc 90 is removed from between the peripheral ring molds 81, 84 it will have the configuration illustrated in FIG. 9. By cutting and polishing the disc 90 along the plate 91, two lens elements similar to those shown in FIG. 1a may be fabricated. This procedure is usually adequate for lens surfaces which are of moderate power and size. However if very thick plastic sheet must be used, surface shape can be improved by casting a form from the final shape of FIG. 9 and vacuum forming plastic of half the thickness to the casting to achieve a shape close to that of the bisector of 90. The surface in contact with the mold is then finished by cutting and polishing as previously described.

Following the process of FIG. 9, it will be noted that two discrete lens elements 94 and 95 are formed. Each of these lens elements is a lens element equivalent to the lens element illustrated in FIG. 1a.

It will be remembered that the upper surface of the lens element illustrated in FIG. 1a was a surface of a compound curvature. Referring to FIG. 10, it has been found that if a single ring mold, such as ring mold 81 has an elastic membrane stretched across its lower surface 83 it will define the complex curvature of the upper surface of the lens element illustrated in FIG. 1. This membrane 97 is fastened at its periphery to the border 83 of the ring mold and stretched across the ring mold at a constant tension.

Providing the membrane 97 is elastic, it has been found that the surface formed with the material is precisely the surface described by the previous lens equation. By the expedient of reinforcing such a stretched membrane and thereafter using this surface as the matrix for a lens mold or simultaneously casting on both sides of the membrane, lenses similar to the lens element shown in FIG. 1a can be generated.

It should be appreciated that the lens here illustrated can be used in a number of anamorphic applications. For example, the anamorphic lens may be one where a relatively wide angle of view is desired. If this be the case a lens array illustrated in FIG. 11 has been found to be most satisfactory.

Figure 11:
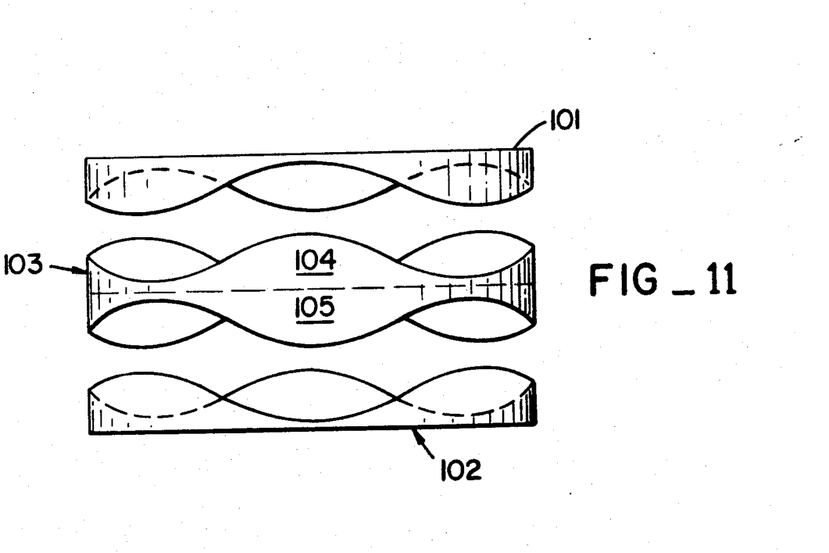

Referring to FIG. 11 three lens elements are illustrated. An upper lens element 101 is formed, a lower lens element 102 and a compound lens element 103 placed therebetween. Compound lens element 103 consists of two discrete lens elements 104 and 105 placed in back-to-back relation at their flat surfaces with their positive $x$ axis of one lens element parallel to the positive $x$ axis of the remaining lens element. Alternately, this lens would be formed of one price of material, by injection molding or casting, for example.

The relative movement of the three lens elements illustrated in FIG. 11 is analogous to that illustrated with respect to FIGS. 2 and 6. Lens element 101 and 102 are translated in one direction, lens element 103, consisting of the back-to-back lens elements 104 and 105 are moved in the opposite translational direction. Anamorphic effects are generated as has been previously illustrated, the exception being that the power is increased by a factor of two per unit of translation and a wider angle of view is permissible through the anamorphic lens system.

It should be appreciated that numerous departures from the specifics of the disclosure illustrated here can be made by those skilled in the optic art without departing from the spirit and scope of this invention.

What is claimed is:

1. A lens element comprising: transparent optical media having first and second optical interfaces with said transparent media disposed between said interfaces, the thickness of said optical media between said optical interfaces including a variation of effective optical thickness measured substantially orthogonal to an $x, y$ Cartesian coordinate axis system disposed substantially parallel to said interfaces, said effective optical thickness variation defined by the terms:

$$A [(x^3/3) - xy^2]$$

wherein:
- $x$ represents displacement on a Cartesian coordinate system substantially parallel to said optic axis;
- $y$ represents displacement on a Cartesian coordinate system wherein said $y$ axis is substantially normal to said $x$ axis in said plane; and
- $A$ is a constant representing the lens power variation.

2. A lens element comprising: transparent optical media having first and second optical interfaces with said transparent media disposed between said interfaces; the thickness of said optical media between said optical interfaces including a variation of effective optical thickness measured substantially orthogonal to a polar axis coordinate system disposed in a plane substantially parallel to said interfaces; said effective optical thickness variation defined by the terms:

$$(Ar^3/3) \cos 3\theta$$

where:
- $r$ is the radius of displacement in the polar coordinate system;
- $\theta$ is the angle of displacement in the polar coordinate system from a preselected 0 angular displacement; and
- $A$ is a constant representing lens power variation per unit translation along the surface.

3. A lens system comprising: first and second lenses arranged in tandem one behind the other along an optic axis; each lens having first and second optical interfaces disposed sub-stantially normal to said optic axis with a transparent lens media disposed between interfaces, the thickness of said optical media of each of said lenses including a variation of effective optical thickness measured substantially orthogonal to an $x, y$ Cartesian coordinate axis system disposed substantially normal to the optic axis, said effective optical thickness variation for said first lens element defined by the terms:

$$(+) A [(x^3/3) - xy^2]$$

said effective optical thickness variation for said second lens element defined by the terms:

$$(-) A [(x^3/3) - xy^2]$$

wherein:
- $x$ represents displacement on a Cartesian coordinate system substantially normal to said optic axis;
- $y$ represents displacement on a Cartesian coordinate system wherein said $y$ axis is substantially normal to said $x$ axis in said plane; and
- $A$ is a constant representing the lens power variation per unit translation over a lens surface.

4. The lens system according to claim 3 and including means for moving said first lens relative to said second lens orthogonally with respect to said optic axis.

5. A lens system comprising: first and second lenses arranged in tandem one behind the other along an optic axis; each lens having first and second optical interfaces disposed substantially normal to said optic axis with a transparent lens media disposed between said interfaces, the thickness of said optical media of each of said lenses including a variation of effective optical thickness measured substantially orthogonal to a polar coordinate system disposed substantially normal to the optic axis, said effective optical thickness variation for said first means defined by the terms:

$$(+) (Ar^3/3) \cos 3\theta$$

said effective optical thickness variation for said second lens element defined by the terms:

$$(-) (Ar^3/3) \cos 3\theta$$

wherein:
- $r$ is the radius of displacement of the polar coordinate system,
- $\theta$ is the angle of displacement of the polar coordinate system from a preselected 0 angular displacement; and
- $A$ is a constant representing a lens power variation per unit of translation.

6. An opthamological device comprising: at least one lens having first and second optical interfaces with transparent lens media therebetween, the maximum lens thickness variation being less than one-half the lens diameter, said lens having a thickness t parallel to an optic axis passing through said optical interfaces substantially normal thereto, said thickness substantially defined by the terms:

$$A [(x^3/3) - xy^2] + Bx^2 + Cxy + Dy^2 + Ex + Fy + G$$

wherein:
- $x$ and $y$ represent points on a rectangular coordinate system described substantially normal to said optic axis;
- $A$ is a constant representing the rate of lens power variation across the surface;
- $B$ is a coefficient representing a contribution to rates of prism power variation across the surface;
- $C$ is a coefficient representing a contribution to rates of prism power variation across the surface;
- $D$ is a coefficient representing a contribution to rates of prism power variation across the surface;
- $E$ is a coefficient representing a contribution to rates of thickness variation across the surface;
- $F$ is a coefficient representing a contribution to rates of thickness variation across the surface; and,
- $G$ is a constant representing lens thickness at an optic axis intersecting the $x, y$ axis.

* * * * *

PO-1050
(5/69)

UNITED STATES PATENT OFFICE
CERTIFICATE OF CORRECTION

Patent No. __3,751,138__   Dated __August 7, 1973__

Inventor(s) __WILLIAM E. HUMPHREY, Oakland, California__

It is certified that error appears in the above-identified patent and that said Letters Patent are hereby corrected as shown below:

In the Title, delete "anamorphic" and insert --astigmatic--;

In the Abstract, line 1, delete "anamorphic" and insert --astigmatic--;

Column 1, lines 1, 13, 23, 32 and 58, delete "anamorphic" and insert --astigmatic--;

Column 4, lines 11, 53, 59 and 64, delete "anamorphic" and insert --astigmatic--;

Column 5, lines 1, 7 and 27, delete "anamorphic" and insert --astigmatic--;

Column 8, line 57, delete "anamorphic" and insert --astigmatic--

Column 9, lines 41, 49, 53 and 58, delete "anamorphic" and insert --astigmatic--;

Column 10, lines 17, 21, 28, 38 and 59, delete "anamorphic" and insert --astigmatic--;

Column 11, lines 5 and 14, delete "anamorphic" and insert --astigmatic--;

Column 12, lines 4, 33, 34, 40 and 49, delete "anamorphic" and insert --astigmatic--;

Column 13, lines 3 and 5, delete "anamorphic" and insert --astigmatic--;

UNITED STATES PATENT OFFICE Page 2
CERTIFICATE OF CORRECTION

Patent No. 3,751,138   Dated August 7, 1973

Inventor(s) William E. Humphrey

It is certified that error appears in the above-identified patent and that said Letters Patent are hereby corrected as shown below:

Column 14, lines 32, 33, 52 and 56, delete "anamorphic" and insert -- astigmatic --.

Signed and sealed this 30th day of April 1974.

(SEAL)
Attest:

EDWARD M. FLETCHER, JR.
Attesting Officer

C. MARSHALL DANN
Commissioner of Patents

UNITED STATES PATENT AND TRADEMARK OFFICE
CERTIFICATE OF CORRECTION

PATENT NO. : 3,751,138
DATED : August 7, 1973
INVENTOR(S) : William E. Humphrey

It is certified that error appears in the above–identified patent and that said Letters Patent are hereby corrected as shown below:

Column 15, line 9, delete "parallel" and insert --normal--.

Signed and Sealed this nineteenth Day of August 1975

[SEAL]

Attest:

RUTH C. MASON
Attesting Officer

C. MARSHALL DANN
Commissioner of Patents and Trademarks